Dec. 24, 1940.  J. M. TYLER  2,225,892
ENGINE MOUNT LOCKING MEANS
Filed Jan. 4, 1940  3 Sheets-Sheet 2
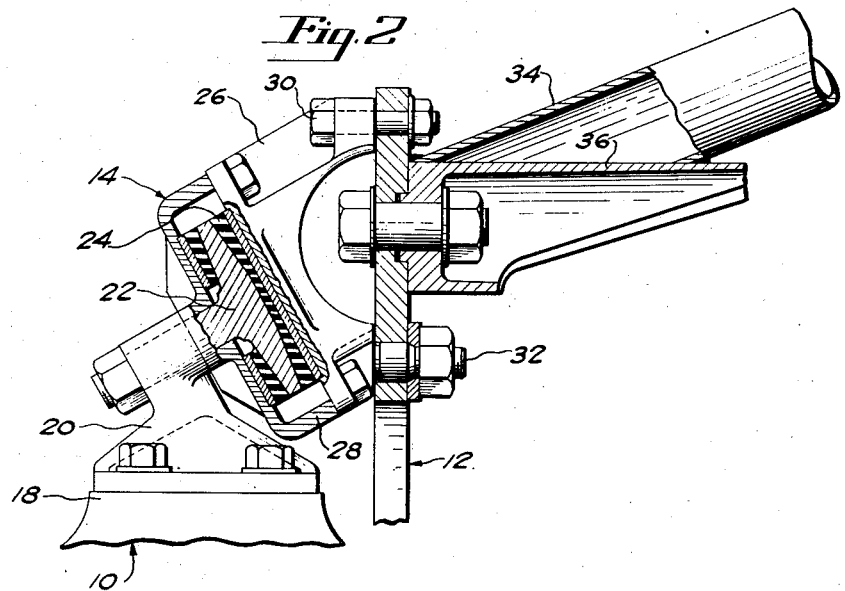
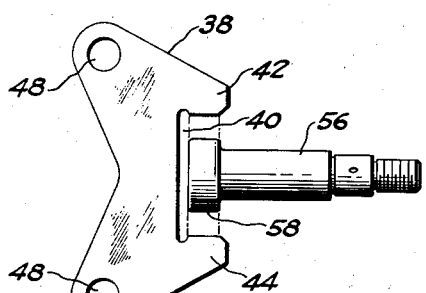
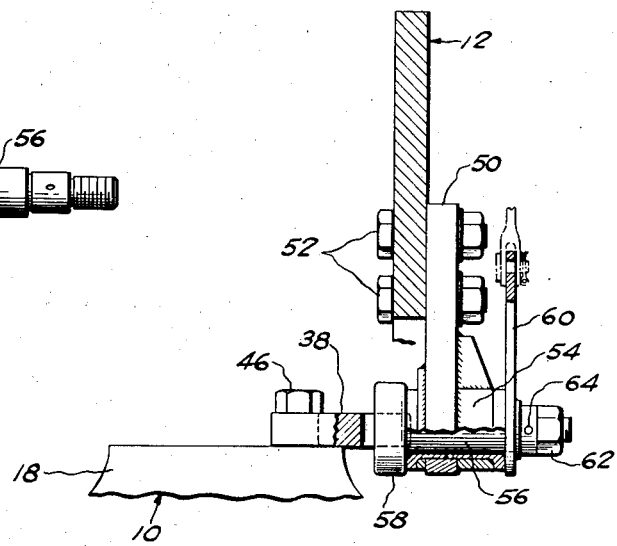
INVENTOR
John M. Tyler
BY Harris G. Luther
ATTORNEY Dec. 24, 1940. J. M. TYLER 2,225,892
ENGINE MOUNT LOCKING MEANS
Filed Jan. 4, 1940 3 Sheets-Sheet 3
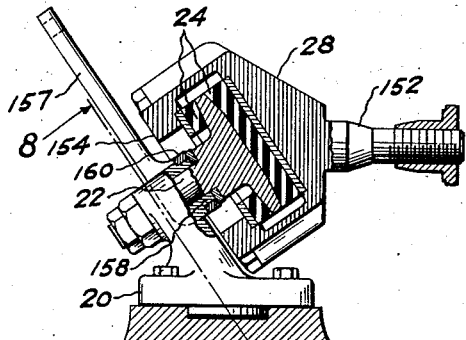
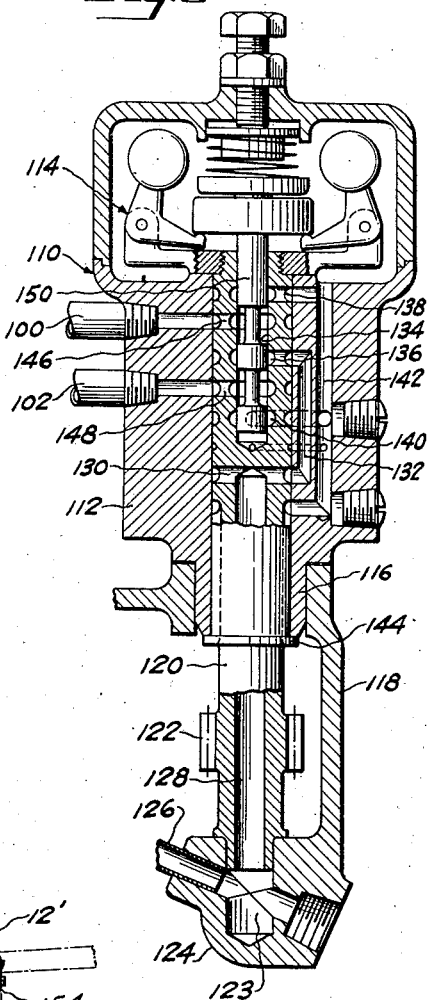
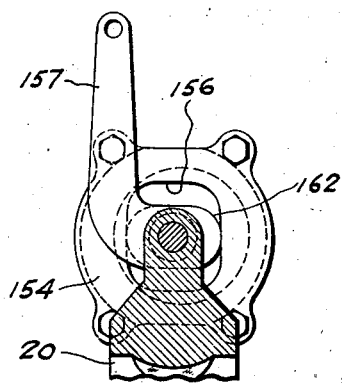
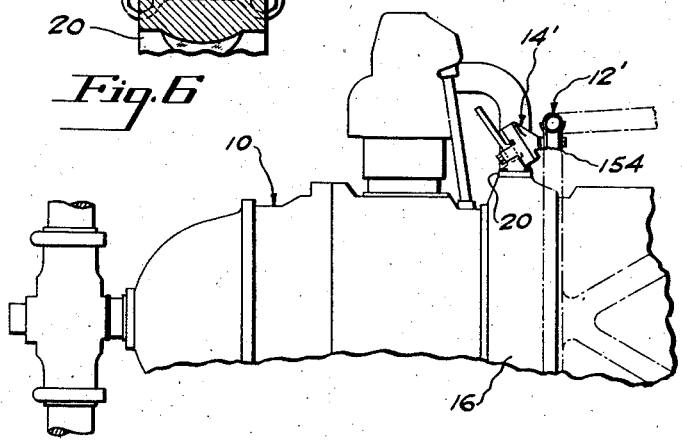
INVENTOR
John M. Tyler
BY
Harris G. Luther
ATTORNEY Patented Dec. 24, 1940

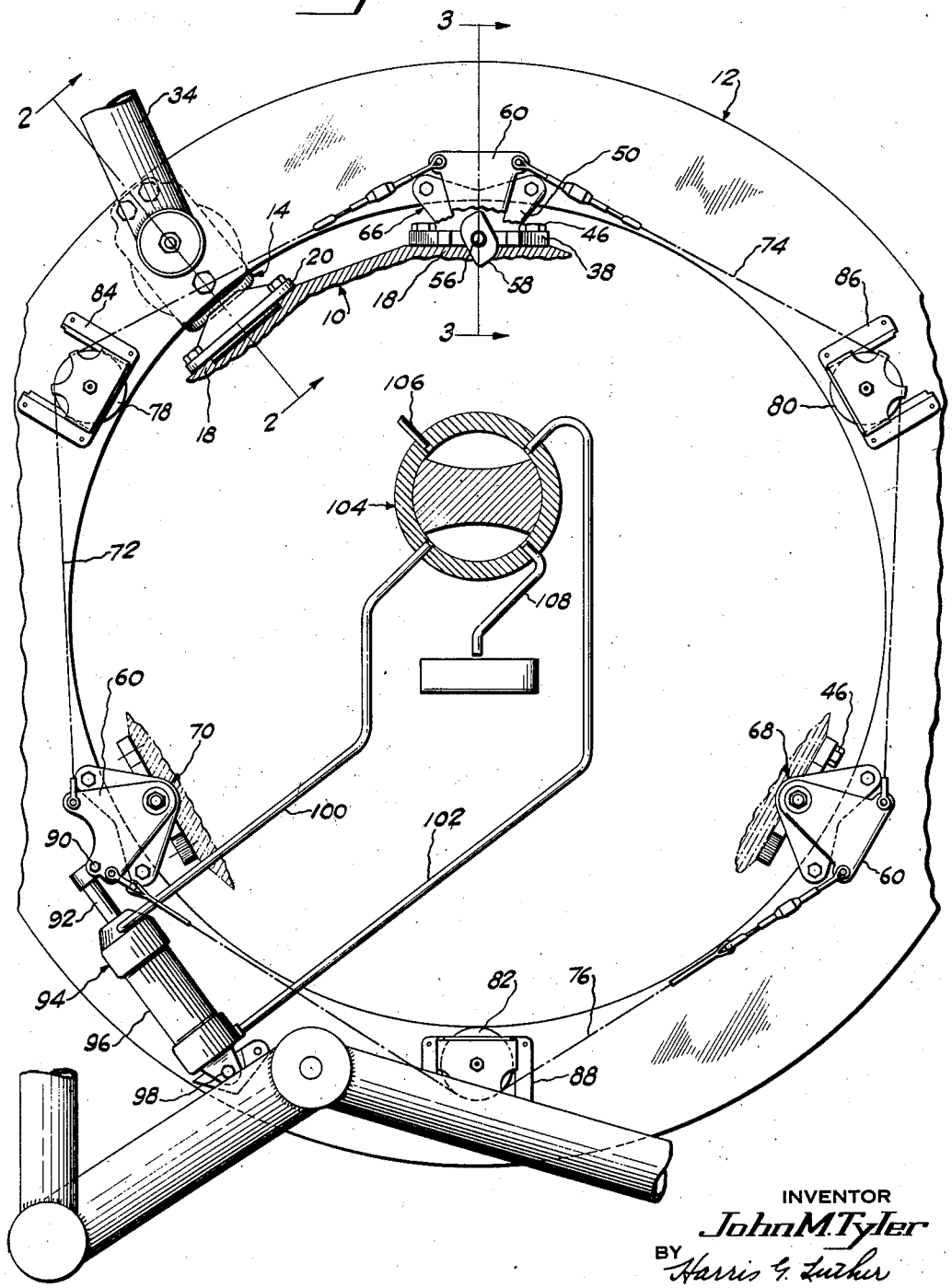

2,225,892

UNITED STATES PATENT OFFICE 2,225,892

ENGINE MOUNT LOCKING MEANS

John M. Tyler, West Hartford, Conn., assignor to United Aircraft Corporation, East Hartford, Conn., a corporation of Delaware Application January 4, 1940, Serial No. 312,389

12 Claims. (Cl. 123—192)

This invention relates to improvements in engine mounts and has particular reference to an improved engine mount for the propulsive engine of a vehicle such as an airplane.

An object of the invention resides in the provision of an engine mount having a predetermined degree of flexibility and means for controlling the flexibility for particular engine operating conditions.

A further object resides in the provision of an improved engine mount of the character indicated which provides a limited amount of resiliently resisted freedom of movements between the engine and its support and includes manually or automatically operable means effective to restrain the engine against movements relative to its support.

A somewhat more specific object resides in the provision in an engine mount including flexible elements arranged to provide resiliently resisted freedom of relative movement between the engine and its supports in a torsional direction, means operative to restrain the engine against movements relative to its support during idling operation of the engine.

Other objects and advantages will be more particularly pointed out hereinafter or will become apparent as the description proceeds.

In the accompanying drawings, in which like reference numerals are used to designate similar parts throughout, there is illustrated in two somewhat different forms a suitable mechanical embodiment for the purpose of illustrating the invention. The drawings, however, are for the purpose of illustration only and are not to be taken as limiting or restricting the invention as it will be apparent to those skilled in the art that various changes in the illustrated constructions may be resorted to without in any way exceeding the scope of the invention.

In the drawings, Fig. 1 is a rear elevational view of an engine mount constructed according to the invention.

Fig. 2 is a sectional view on the line 2—2 of Fig. 1.

Fig. 3 is a sectional view on the line 3—3 of Fig. 1.

Fig. 4 is a plan view of a portion of the locking device for restraining the engine against movement relative to its mount.

Fig. 5 is a sectional view of a speed responsive device for actuating the mount locking mechanism.

Fig. 6 is an elevational view of a fragmentary portion of an engine and engine mount showing the application thereto of a somewhat modified form of resilient mounting element and lock therefor.

Fig. 7 is a sectional view through the resilient mounting element shown in Fig. 6, and Fig. 8 is a bottom plan view of the resilient mounting element and locking device shown in Fig. 7.

Referring to the drawings in detail, the numeral 10 generally indicates the engine and the numeral 12 generally indicates a mounting ring to which the engine is secured by resilient elements generally indicated at 14. A portion of the engine, such as the annular blower section 16, is provided with radially spaced pads or bosses 18 to which the base portions 20 of the resilient elements are secured. Each of the base elements carries a metal core member 22 having a flattened head portion imbedded in a disc 24 of resilient material such as rubber. The rubber disc is received in a head member constituted by the separable elements 26 and 28, the head being secured to the mounting ring 12 by suitable means such as the bolts, indicated at 30 and 32. For a more detailed description of the resilient mounting pedestals herein indicated reference may be had to United States application Serial No. 279,717, filed June 17, 1939, by John M. Tyler for Flexible supports.

The ring 12 may be provided in various forms such as the flat plate member illustrated in Figs. 1, 2 and 3 or the annular tubular member illustrated in Fig. 6 and is mounted on an engine carrying frame which may be conveniently formed up of welded tubular members, as indicated at 34 and 36, the end of the frame opposite the mounting ring being securely attached to the framework of the vehicle.

As is particularly explained in United States application Serial No. 279,717, referred to above, the resilient discs 24 are so constructed and arranged and the pedestals 14 are so disposed with respect to the engine and the mounting ring that the engine has a relatively large freedom of movements with respect to the mounting ring in a rotational or torsional direction but is held substantially rigidly against movements toward and away from the mounting ring.

The flexible pedestals have an important vibration modifying function and are designed to have a low transmission of engine vibrations to the engine supporting frame and the vehicle under selected engine operating conditions. It is important to suppress the transmission of vibrations and modify the engine vibrations for engine power operating conditions. It has been found that when the mount is designed to suppress the transmission of vibration under engine power operating conditions the engine resonates with low frequency engine impulses at idling speeds and vibrations of large amplitude result. Because of these considerations it has been found desirable to incorporate into the flexible mount some provision for restraining the engine against undue movements relative to its mount when idling. Since the forces present during idling operation of the engine are not excessively large, a mechanical lock-up providing a relatively rigid connection between the engine and its support has been found satisfactory for this purpose.

In the form of the invention shown in Figs. 1, 2, 3 and 4, only a portion of the mounting pads 18 are used for the flexible pedestal connections and the remaining pads are used to carry the locking mechanisms. In this form of the invention a relatively fixed plate 38 is secured to each of the pads 18 not used to carry a connecting pedestal 14. As is particularly shown in Fig. 4 the plate 38 is provided with an indentation 40 to form a pair of similar oppositely disposed jaws 42 and 44 which jaws are disposed somewhat to the rear of the mounting ring 12 when the plate is secured on the respective engine pad 18 by suitable means such as the bolts or cap screws 46 passing through suitable apertures 48 in the plate and threaded into the material of the engine section. A supporting plate 50 is secured to the ring 12 by suitable means such as the through bolts 52 and projects inwardly from the plate to a position opposite the indentation 40 in which position it is provided with a cylindrical bearing 54 within which is rotatably mounted a shaft 56 provided at one end with a cam 58 located within the indentation 40 between the jaws 42 and 44. The cam 58 is so shaped that, when in the position illustrated in Fig. 1 and in full lines in Fig. 4, it is spaced from both of the jaws 42 and 44 by an amount sufficient to permit the required vibration modifying movement between the engine and its support and, when moved to the position indicated by the dotted lines in Fig. 4, it engages both of the jaws 42 and 44 and restrains the engine against movement relative to its support. The cam may be moved from one to the other of the above positions by a rotational movement of the shaft 56 which movement may be imparted to the shaft by some suitable or desired mechanism one suitable arrangement of which is particularly illustrated in Figs. 1 and 3 of the accompanying drawings. In the illustrated arrangements the shaft 56 has secured to the end thereof opposite the cam 58 a radial lever 60. This lever may be secured on the shaft by suitable means such as the nut 62 and may be restrained against rotation relative to the shaft by suitable means such as the pin 64 extending through the shaft and through a cylindrical bushing formed integrally with or rigidly secured to the lever. While three locking devices, generally indicated at 66, 68 and 70 and angularly spaced about the mounting ring 12, have been illustrated in Fig. 1, since the construction of all of these devices is the same, a detailed description of only one locking device has been considered sufficient for the purpose of the illustration.

The cam rotating levers 60 of all of the locking devices are connected by suitable means such as the flexible cables 72, 74 and 76. Preferably each cable is run over a guide pulley, indicated at 78, 80 and 82, respectively, secured to the mounting ring between adjacent locking devices in order to maintain the cables clear of the portion of the engine which projects through the mounting ring and give to the cables the proper direction of pull on the respective levers 60. The pulleys may be rotatably mounted in suitable brackets, as indicated at 84, 86 and 88, respectively, rigidly secured to the mounting ring at the proper angular positions. One of the levers 60 is provided with an extension 90 to which is secured the projecting end of the plunger 92 of a double acting hydraulic servo-motor, generally indicated at 94, the cylinder 96 of which is connected at one end to the ring 12 by the pivotal connection 98. The opposite ends of the cylinder 96 are hydraulically connected through the conduits 100 and 102 to a manually four-way valve, generally indicated at 104, having a pressure connection 106 from some suitable source of fluid under pressure such as the engine oil supply, and a drain connection 108. By manually controlling the valve 104 the servo-motor 94 can be made to move the lever 60 to which it is connected to rotate the associated cam to either one of the above indicated positions. Since the levers 60 of the other locking devices are operatively connected to the lever to which the servo-motor is connected all the cams will be simultaneously moved and the flexible mount may be locked or released at the will of the operator of the vehicle.

In some installations it may be desirable to render the locking and unlocking of the flexible mount automatic rather than subject to operator control in which case an automatic device, such as the speed responsive governor actuated valve illustrated in Fig. 5 and generally indicated at 110, may be substituted for the manually actuatable valve 104.

This valve may conveniently comprise a casing 112 the upper portion of which provides a chamber for the speed responsive governor mechanism, generally indicated at 114, and the lower portion of which is provided with a cylindrical extension 116 seated in an aperture provided in the engine casing 118. The casing 112 is provided with a central bore through which extends the governor drive shaft 120 operatively connected at its upper end with the speed responsive governor 114 and provided near its lower end with a gear 122 which meshes with a suitable gear driven by the engine. At its lower end the shaft 120 projects into a cavity 123 formed in an engine case extension 124 which cavity is connected by means of a tube 126 with the engine lubricating oil supply. The drive shaft 120 has a coaxial bore 128 extending from the cavity in the extension 124 to ports 130 leading to the exterior of the drive shaft 120 within the casing 112. From the ports 130 a channel 132 through the casing 112 carries the pressure oil to an upper bore 134 in the drive shaft through the ports 136. Ports 138 and 140 disposed one on each side of the port 136 connect with a channel 142 in the casing 112 which channel leads to the interior of the engine case 118 through suitable slots provided in the shaft bushing 144 to provide a drain connection for the valve. A port 146, located between the ports 138 and 136, leads from the bore 134 to the conduit 100 and a similar port 148, located between the ports 136 and 140, leads from the bore 134 to the conduit 102. Within the bore 134 there is a slidable valve plunger 150 operatively connected with the governor 114 and provided with pistons which control the ports 138, 146, 136, 148 and 140 in a manner such that when the speed is low, as when the engine is idling, the conduit 102 is connected with drain and the conduit 100 is connected with the pressure fluid from the channel 126, and when the engine speed is high the conduit 100 is connected with drain and the conduit 102 is connected with the fluid under pressure from the channel 126. With this arrangement, when the engine is idling the hydraulic fluid under pressure will be supplied to the hydraulic servo-motor 94 through the conduit 100 to operate the ram in a direction to turn the cams 58 into engagement with the jaws of the plates 38, and when the engine begins to operate at a speed above the idling speed, the fluid will be supplied to the servo-motor through the conduit 102 to actuate the servo-motor in a direction to rotate the cams 58 out of engagement with the jaws of the plates 38 to permit the engine to move relative to its support within the limits of the resilient mountings 14.

In the form of the invention shown in Figs. 6, 7 and 8 the construction and operation of the resilient mounts and locking devices is much the same as that described above except that in this modified arrangement the locking devices are incorporated in the respective flexible pedestal mounts. As shown in Fig. 6, the engine 10 is connected to the mount ring 12' by a number of flexible pedestal mounts 14' angularly spaced around the engine and the ring. Reference may be had to Figs. 7 and 8 for a detailed disclosure of a typical combined flexible pedestal connection and locking device. As illustrated, the bases 20 are secured to the respective pads or bosses on an annular engine section by suitable bolts and each cover is connected to the mount ring by suitable means such as the shaft 152 which extends through an apertured bracket 154 secured to the ring. The core member 22 of each flexible connection has a flattened head portion received in the hollow interior of the cover 28 and imbedded in a disc 24 of resilient material which is secured in the cover by a suitable flange plate 154 bolted to the wall of the cover member. The flange plate is provided with an enlarged aperture 156 which surrounds the stem portion of the core 22 and is annularly spaced therefrom. A lever member 157 is rotatably mounted on the cylindrical part 158 of the base 20 surrounding an intermediate portion of the core 22, by a bearing 160. This lever carries a cam 162 which is also supported on the bearing 160 and is rotatable about the cylindrical portion of the base member and the base member and the intermediate portion of the core. This cam 162 cooperates with the wall of the aperture 156 in the cover plate 154 in such a manner that when the lever is in one position the cam engages the aperture wall on each side and restrains the cover member 28 against movement relative to the core 22 and base member 20 and when the lever is in a different position the cam is free of the walls of the aperture to permit the cover member 28 of the flexible pedestal to move relative to the core and base portion within the limits of flexibility of the resilient disc 24 or the clearance between the cover and the head portion of the core.

The combined flexible mount and locking units are all similar in construction so that the above description of a single unit is believed to be adequate for the purposes of this disclosure.

The levers 157 of all of the combined units are preferably connected together by some suitable means such as the cables of Fig. 1 and are simultaneously movable by some manually or automatically controlled device such as the hydraulic jack 94 of Fig. 1 and the valve 104 or governor 110 although various forms of control devices may be utilized without in any way exceeding the scope of the invention.

While two slightly different mechanical embodiments have been hereinabove described and illustrated in the accompanying drawings for the purpose of disclosing the invention, it is to be understood that the invention is not limited to the particular constructions so illustrated and described, but that such changes in the size, shape and arrangements of the various parts may be resorted to as come within the scope of the sub-joined claims.

Having now described the invention so that others skilled in the art may clearly understand the same, what it is desired to secure by Letters Patent is as follows:

1. In an engine mount including a support and resilient connecting means providing a limited freedom of resiliently resisted movement between the engine and its support, releasable lock means for restraining the engine against movement relative to its support in at least one direction.

2. In combination with an engine, an engine support, and resilient units connecting said engine with said support to provide a resiliently resisted freedom of relative movement between the engine and the support, a releasable lock mechanism between said engine and said support operative to positively restrain said engine against movement relative to said support in at least one direction.

3. In combination with an engine, an engine support, and resilient units connecting said engine with said support to provide a resiliently resisted freedom of relative movement between the engine and the support, a manually operable lock mechanism between said engine and said support operative to restrain said engine against movement relative to said support in at least one direction.

4. In combination with an engine, an engine support, and resilient units connecting said engine with said support to provide a resiliently resisted freedom of relative movement between the engine and the support, a releasable lock mechanism between said engine and said support, and means responsive to engine operating conditions for actuating said lock mechanism to restrain said engine against movement relative to said support in at least one direction.

5. In combination with an engine, an engine support, and resilient units connecting said engine with said support to provide a resiliently resisted freedom of relative movement between the engine and the support, a releasable lock mechanism between said engine and said support operative to restrain said engine against movement relative to said support in at least one direction, and engine speed responsive means for actuating said lock mechanism.

6. In an engine mount including a support and resilient connecting units providing a limited freedom of resiliently resisted movement between the engine and its support, releasable lock means in parallel with said resilient units operative to restrain said engine against movement in at least one direction relative to its support.

7. In combination with an engine, an engine support, and units connecting said engine with said support each including an engine attached portion, a support attached portion, and a resilient cushion between said two portions to provide a limited freedom of resiliently resisted movement between said portions, and a releasable lock between said portions to restrain said portions against relative movements in the direction of engine torque.

8. In combination with an engine, an engine support, and units connecting said engine with said support each including an engine attached portion, a support attached portion, and a resilient cushion between said two portions to provide a limited freedom of resiliently resisted movement between said portions, and a releasable lock between said portions to restrain said portions against relative movements in at least one direction, said lock means comprising, a cam rotatably mounted on one of said portions and rotatable between a position in which it is clear of the other portion and a position in which it engages said other portion, and a lever for rotating said cam.

9. In an engine mount including a support member, a set of attachment points on said engine, a set of complementary attachment points on said support member and resilient connecting means extending between opposed attachment points of said two sets and providing a limited freedom of resiliently resisted movements between the engine and its support, releasable lock means for restraining the engine against movement relative to its support in at least one direction, said locking means comprising, one or more locking units arranged in parallel with said connecting units, each locking unit comprising, a plate carried by an attachment point of one of said sets and provided with spaced jaws, a cam carried by an attachment point of the other of said sets and located between said jaws, and means for rotating said cam between a position in which it is clear of said jaws and a position in which it engages said jaws.

10. In an engine mount including resilient connecting means providing a limited freedom of resiliently resisted movement beteween the engine and its support, releasable lock means for restraining the engine against movement relative to its support in at least one direction, said locking means comprising, one or more locking units arranged in parallel with said connecting units, each locking unit comprising, a plate carried by said engine and provided with spaced jaws, a cam carried by said mount and located between said jaws, and means for rotating said cam between a position in which it is clear of said jaws and a position in which it engages said jaws, said cam rotating means comprising a lever secured to said cam, a hydraulic motor device for moving said lever, and a valve for controlling said motor device.

11. In an engine mount including resilient connecting means providing a limited freedom of resiliently resisted movement between the engine and its support, releasable lock means for restraining the engine against movement relative to its support in at least one direction, said locking means comprising, one or more locking units arranged in parallel with said connecting units, each unit comprising, a plate carried by said engine and provided with spaced jaws, a cam carried by said mount and located between said jaws, and means for rotating said cam between a position in which it is clear of said jaws and a position in which it engages said jaws, said cam locating means comprising a lever secured to said cam, a motor for moving said lever, and means for controlling said motor.

12. In combination with an engine, an engine support, and resilient units connecting said engine with said support to provide a resiliently resisted freedom of relative movement between the engine and the support, a plurality of releasable lock devices between said engine and said support operative to restrain said engine against movement relative to said support in at least one direction, each of said lock devices comprising a cam carried by one of said relatively movable members including said engine and said support, an abutment carried by the other of said members, a lever for rotating each cam between a position in which it is clear of the respective abutment and a position in which it engages the respective abutment, means connecting all of said levers for simultaneous movement, a motor device for turning said levers, and means for controlling said motor device.

JOHN M. TYLER.